United States Patent [19]

Hoehn, Jr.

[11] Patent Number: 4,458,767
[45] Date of Patent: Jul. 10, 1984

[54] METHOD FOR DIRECTIONALLY DRILLING A FIRST WELL TO INTERSECT A SECOND WELL

[75] Inventor: Gustave L. Hoehn, Jr., Dallas, Tex.

[73] Assignee: Mobil Oil Corporation, New York, N.Y.

[21] Appl. No.: 426,030

[22] Filed: Sep. 28, 1982

[51] Int. Cl.³ .............................................. E21B 7/04
[52] U.S. Cl. ..................................... 175/61; 166/255; 166/65 M; 166/66; 175/45
[58] Field of Search ........................... 175/61, 45, 328; 166/250, 254, 255, 65 M, 66; 324/346

[56] References Cited

U.S. PATENT DOCUMENTS

| | | | |
|---|---|---|---|
| 2,259,904 | 10/1941 | McNamee et al. | |
| 3,114,876 | 12/1963 | Schuster | 166/255 |
| 3,277,363 | 10/1966 | Schuster | |
| 4,224,989 | 9/1980 | Blount | 175/61 |
| 4,372,398 | 2/1983 | Kuckes | 175/61 |

FOREIGN PATENT DOCUMENTS 983704 2/1976 Canada ................................ 166/255

OTHER PUBLICATIONS

Robinson, J. D., "Magnetostatic Methods for Estimating Distance and Direction from a Relief Well to a Cased Wellbore," JPT, Jun. 1972, pp. 741-749.

*Primary Examiner*—Ernest R. Purser
*Assistant Examiner*—Mark J. Del Signore
*Attorney, Agent, or Firm*—Alexander J. McKillop; Michael G. Gilman; Charles J. Speciale

[57] ABSTRACT

A first well is directionally drilled to intersect a second well. The second well is magnetized along its well casing to produce a magnetic anomaly which is sensed by a magnetometer located in the first. The drilling of the first well is redirected in accordance with the magnitude of the sensed anomaly so as to cause intersection of the first well with the second well.

8 Claims, 3 Drawing Figures

METHOD FOR DIRECTIONALLY DRILLING A FIRST WELL TO INTERSECT A SECOND WELL

BACKGROUND OF THE INVENTION

Production of subsurface oil and gas deposits is typically from deep wells drilled through high pressure formations. Lining the wellbore from top to bottom is steel casing, anchored by a sheath of cement that is securely and circumferentially bonded to both the casing and the wall of the wellbore. The control of the underground pressure is an important factor in both the drilling and the production operations. Improper well control can result in the sudden and uncontrollable release of hydrocarbons. Such an incident is commonly referred to as a blowout, resulting in dangerous and costly delays in the drilling or production operations. Such blowouts often catch fire or are otherwise hazardous at the surface, necessitating the drilling of a relief well from a remote surface location to effect a subsurface kill.

Generally, the relief well must approach the blowout well within some reliably known close distance within a limited depth range. This kill distance varies from a maximum of about 25 feet in a high permeability limestone formation down to a direct intersection where the kill is made casing-to-casing or in a tight sandstone.

Conventional directional drilling practice determines the direction and position of boreholes by running hole direction surveys and processing the directional data from hole position. The directional measurements are commonly made using a magnetic compass and inclinometer. The standard deviation of these directional measurements is not accurately known, but is probably greater than the resolution of the instruments. There are other random errors due to instrument friction and mounting instability, tool alignment in the borehole, gravity pertubations, magnetic variation uncertainty, magnetic disturbance of the drill pipe, etc. In addition to these random errors, there are bias errors. The largest bias error is probably in the compass reading caused mostly by poor calibration and the drillpipe magnetic disturbance. The total directional bias error can range up to a few degrees or even more.

Presently, relief well drilling involves directionally drilling the relief well down to the blow out well position calculated from the directional survey. However, when a direct intersection between the relief well and blow out well is required, such a "hit or miss" operation of relief well drilling can become quite time consuming and costly where several relief wells are drilled before a direct intersection is achieved.

SUMMARY OF THE INVENTION

In accordance with the present invention, a first well is directionally drilled toward an intersect position along a second well having its casing magnetized at least along that portion of the second well to be intersected by the first well. The anomaly of the magnetized casing of the second well at the intersect position is sensed from a position within the first well as the directional drilling of the first well approaches the second well. The drilling of the first well is directed toward the intersect position on the second well in response to the sensed anomaly.

The sensing of the anomaly of the second well includes the detection of magnetic flux leakage at a plurality of spaced apart locations along the casing of the second well, such magnetic flux leakage being detectable at a distance at least equal to the distance between each of such plurality of spaced apart locations.

In a further aspect of the invention, the directional drilling of the first well may be directed away from a possible intersection with a second well in response to the sensed anomaly.

DESCRIPTION OF THE PREFERRED EMBODIMENT

Figure 1:
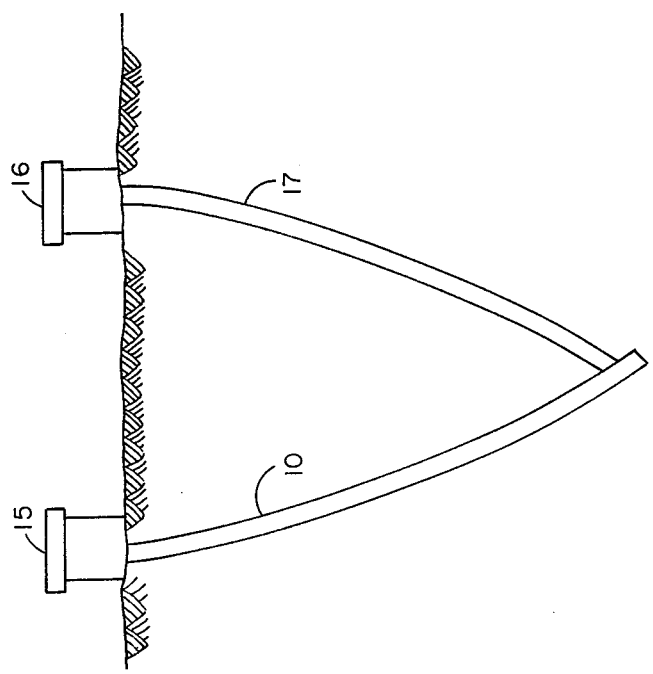
FIG. 1 illustrates the directional drilling of a relief well to intersect a blow out well.

Referring to FIG. 1 there is shown a blowout well 15 with well bore 10 and a relief well 16 with well bore 17 having a trajectory such that it intersects the well bore 10 of the blowout well at a position near the bottom of the well bore 10. Such an intersection near the bottom of the blow out well 10 permits the pumping of mud or cement from the relief well into the blowout well through the producing formation in order to kill the blowout.

The casing of the well bore 10 has been magnetized before blowout occurs. A flux gate magnetometer located near the bottom of the relief well being drilled senses for the magnetic anomaly provided by the previously magnetized casing of the blow out well as the directional drilling of the relief well approaches the desired intersection with the blowout well. This directional drilling is then redirected as necessary to the desired intersect location. A suitable flux gate magnetometer suitable for use in the relief well is the Tensor Model 7002XX or the Develco Tri-Axial magnetometer.

Figure 2:
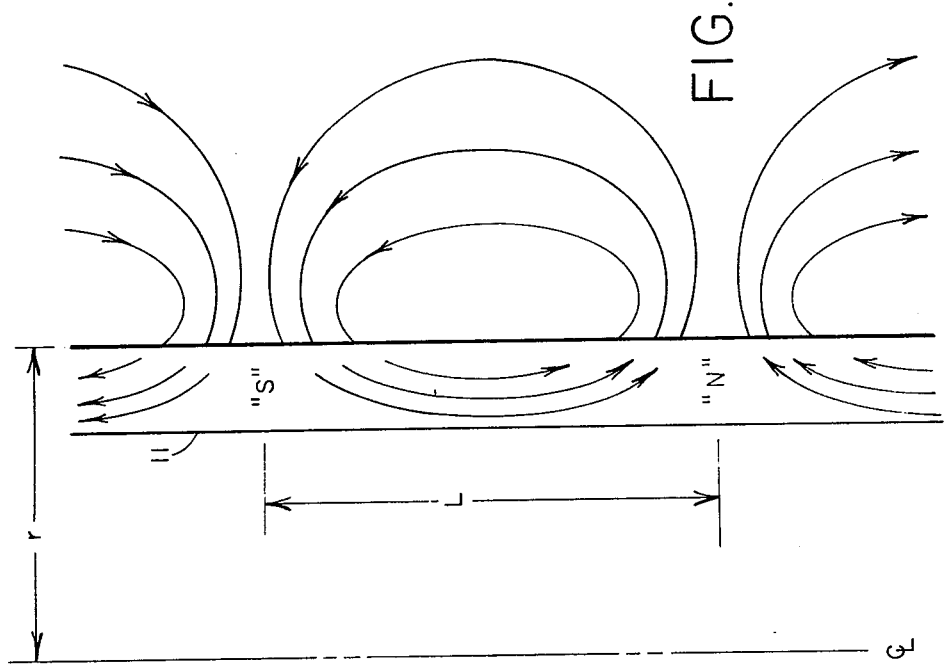
FIG. 2 illustrates the magnetic anomaly created by the well casing of the blow out well of FIG. 1.
Figure 3:
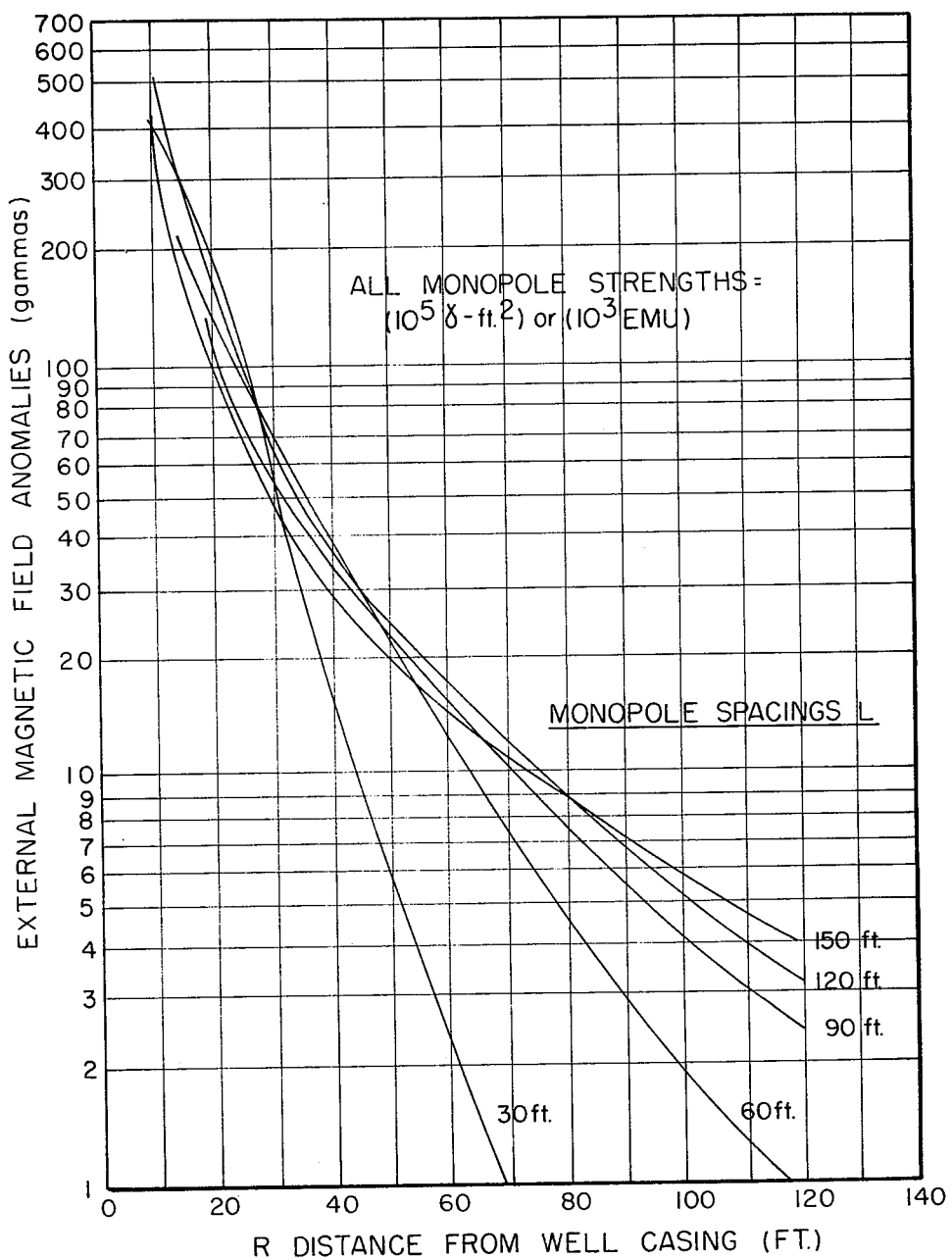
FIG. 3 illustrates the magnetic anomaly of the well casing of FIG. 2 as a function of distance into the formation surrounding the well casing.

More particularly, the anomaly created by the magnetization of the casing of the well bore 10 may be as illustrated in FIG. 2 wherein a plurality of alternating N and S magnetic poles are spaced along the casing 11. The distance L between such poles should be of sufficient distance to maximize the detection range of the casing from a relief well or other well into which a magnetometer is located. Preferably, the desired magnetic field strength is created at a radial distance outward from the well casing at least equal to the distance between the magnetic flux leakage points. FIG. 3 illustrates magnetic anomaly as a function of distance from the magnetized well casing for spaced magnetic monopoles of alternating polarity of 30 feet, 60 feet, 90 feet, 120 feet and 150 feet. It can be seen that as the spacing distance L between the monopoles is increased, the distance of detection of the anomaly from the well casing is increased. This is due to the fall of the magnetic field strength at the rate of $1/R^2$ where R is the distance from the magnetometer in the relief or other well bore to the magnetized well casing 11 in the well bore 10 for example.

In magnetizing the well casing 11, a preferred internal magnetizer is comprised of an 18 inch Armco soft iron core of 1¼ inch diameter with a two layer winding of #16 copper wire. A monopole magnetic pole strength of $1.8 \times 10^5 \alpha\text{-ft}^2$ ($1.8 \times 10^3$ emu) was produced with a 30 volt D.C. pulse supplied to the magnetizer from the capacitive discharge of an uphole power supply. When the polarity of the D.C. power to the magnetizer is reversed a magnetic pole develops in the casing 11. By causing those reversals to occur at several feet or more along the casing 11, a magnetic anomaly is created in the casing which is detected by the magnetometer in the relief well being drilled for intersection with the casing 11 of the blow out well.

It is to be understood that the foregoing merely describes one embodiment of the present invention. Various modifications, as well as alternate embodiments, may become apparent to one skilled in the art without departing from the scope and spirit of the invention as hereinafter defined by the appended claims. For example, the present invention may be useful in preventing the drilling of a new production well into an existing production well in a crowded production field. By sensing the magnetic anomaly of the magnetized casing of the existing production well, the direction of drilling of the new and nearby well can be changed to prevent the intersection of such wells.

I claim:

1. A method of drilling a first well to intersect a second well, comprising the steps of:
   (a) directionally drilling a first well toward an intersect position along a second well having its casing magnetized to contain a plurality of spaced alternating magnetic poles at least in and along that portion of said second well to be intersected by said first well, each of said alternating poles being spaced from another pole by a distance of at least 30 feet, said poles producing flux leakage from said casing at a plurality of spaced apart locations along said second well,
   (b) magnetically sensing from a position within said first well for the anomaly of the magnetized casing of said second well at the intersect position as the directional drilling of said first well approaches said second well, and
   (c) directing the drilling of said first well toward the intersect position along said second well as the magnetic anomaly of the casing of said second well is sensed during directional drilling.

2. The method of claim 1 wherein the step of magnetically sensing for the casing anomaly of said second well at the intersect position includes the determination of the distance and direction of said first well to the intersect position on said second well.

3. The method of claim 1 wherein the step of magnetically sensing the anomaly of the magnetized casing of said second well during directional drilling of said first well comprises the detection of magnetic flux leakage from the casing of said second well.

4. The method of claim 1 wherein the anomaly of the magnetized casing of said second well is sensed from said position within said first well at a distance at least equal to the distance between each of said spaced apart locations along the well casing of said second well.

5. The method of claim 1 wherein said magnetic sensing is effective to redirect said first well to the intersect position on said second well when the directional drilling of said first well approaches within a few hundred feet of said intersect position.

6. A method of drilling a first well in the vicinity of an existing second well, comprising the steps of:
   (a) magnetizing the well casing of said second well to produce a plurality of spaced alternating magnetic poles at least in and along a portion of said second well, each of said alternating poles being spaced from another pole by a distance of at least 30 feet, said poles producing flux leakage from said casing at a plurality of spaced apart locations along said second well,
   (b) directionally drilling said first well,
   (c) magnetically sensing from a position within said first well for the anomaly of the magnetized casing of said second well as the directional drilling of said first well approaches said second well, and
   (d) redirecting the drilling of said first well in response to the magnetic sensing of said anomaly.

7. The method of claim 6 wherein said magnetic sensing is effective to redirect said first well away from an intersecton with said second well.

8. The method of claim 6 wherein said magnetic sensing is effective to redirect said first well to an intersection with said second well.

* * * * *